US006671281B1

(12) United States Patent  (10) Patent No.: US 6,671,281 B1
Tsuda  (45) Date of Patent: Dec. 30, 2003

(54) ATM LAN EMULATION NETWORK HAVING LECS FOR PROVIDING ATM ADDRESS OF LES OF TARGET ELAN

(75) Inventor: Masahiro Tsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/452,393

(22) Filed: Dec. 1, 1999

(30) Foreign Application Priority Data

Dec. 3, 1998 (JP) .......................................... 10-344637

(51) Int. Cl.[7] .............................................. H04L 12/56
(52) U.S. Cl. .................................... 370/396; 370/395.53
(58) Field of Search .............................. 370/396, 395.1, 370/397, 395.2, 395.3, 395.31, 395.32, 395.5, 395.51, 395.52, 395.53, 395.54, 351, 352, 389, 392, 254, 255, 257, 400–405, 465, 466, 408; 709/217, 218, 219, 238, 220

(56) References Cited

U.S. PATENT DOCUMENTS

| 5,805,805 A | * | 9/1998 | Civanlar et al. ............ 709/220 |
| 5,812,552 A | * | 9/1998 | Arora et al. ........... 370/395.53 |
| 6,104,870 A | * | 8/2000 | Frick et al. .................... 703/27 |
| 6,189,041 B1 | * | 2/2001 | Cox et al. .................... 709/238 |
| 6,285,674 B1 | * | 9/2001 | Soni et al. ................... 370/390 |

FOREIGN PATENT DOCUMENTS

| JP | 8-223181 | 8/1996 |
| JP | 8-331152 | 12/1996 |
| JP | 10-75258 | 3/1998 |
| JP | 10-98480 | 4/1998 |

OTHER PUBLICATIONS

"Definitive Explanations of ATM Protocols," translated by Harumi Ase et al, Nikkei BP Publishing, Oct. 19th, 1998 pp. 121–144.
Nikkei Communication No. 173, pp. 47–55.
"ATM–LAN," by Hiroshi Shimizu et al, Software Research Center, Jul. 5th, 1995, pp. 135–153.

* cited by examiner

Primary Examiner—Douglas Olms
Assistant Examiner—Brian Nguyen
(74) Attorney, Agent, or Firm—Sughrue Mion, PLLC

(57) ABSTRACT

An ATM LAN emulation network is disclosed, in which a terminal can easily access an ELAN, to which he terminal was previously connected, via another ELAN. In this system, an LECS is mounted at each router, and the ATM address of the LECS is stored in advance in the ATM switch. When a terminal is connected to the ATM switch, the terminal is connected to an LECS using a Well-known address. When the LECS communicating with the terminal connected to the first ELAN receives a request for obtaining the ATM address of the second ELAN to which the terminal was previously connected, the LECS obtains the ATM address of the LECS of another ELAN of the next hop according to the IP routing information. If the next-hop LECS is connected to the second ELAN, the terminal can obtain the ATM address of the LES which manages the second ELAN via the LECS communicating with the terminal.

2 Claims, 2 Drawing Sheets

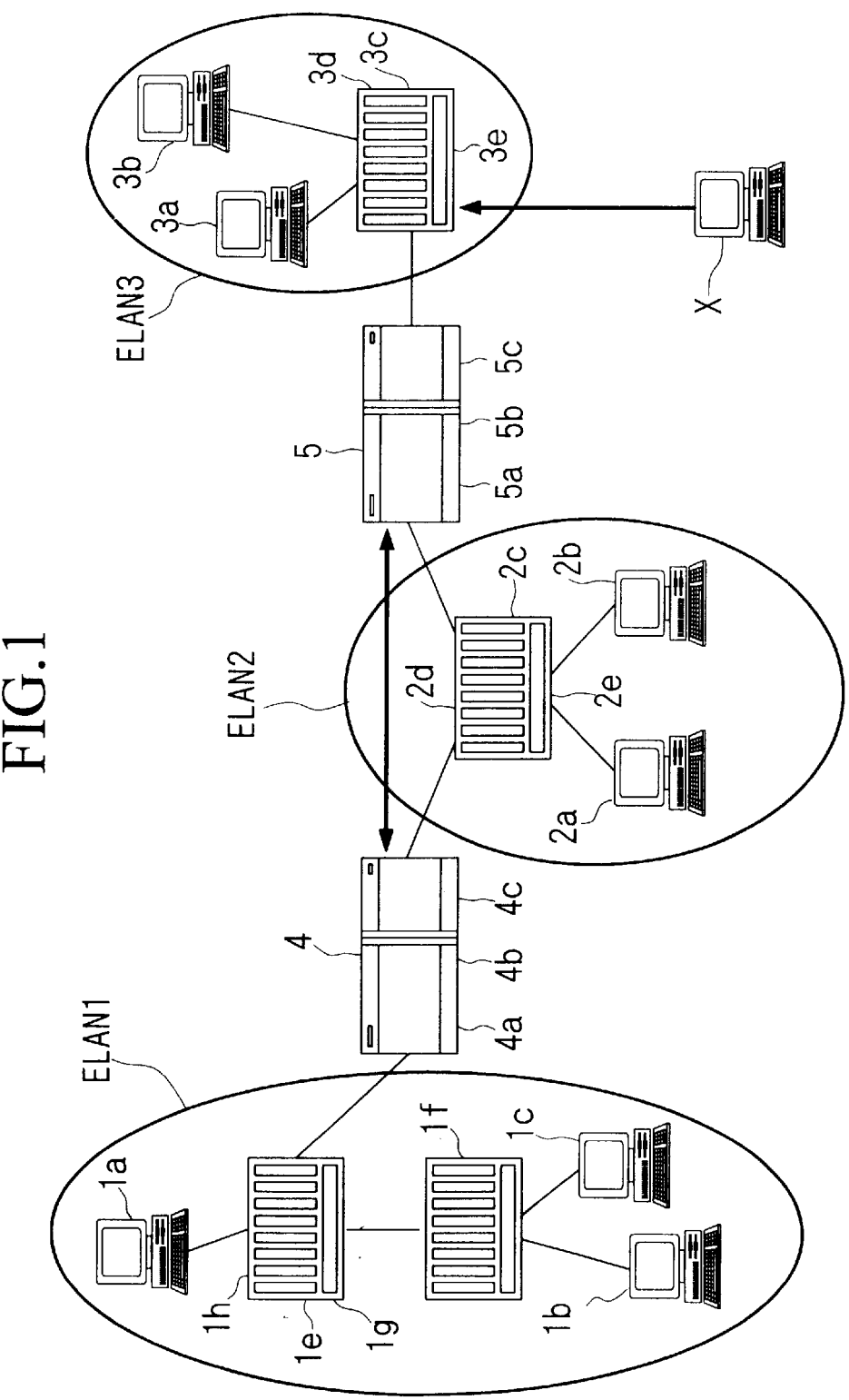

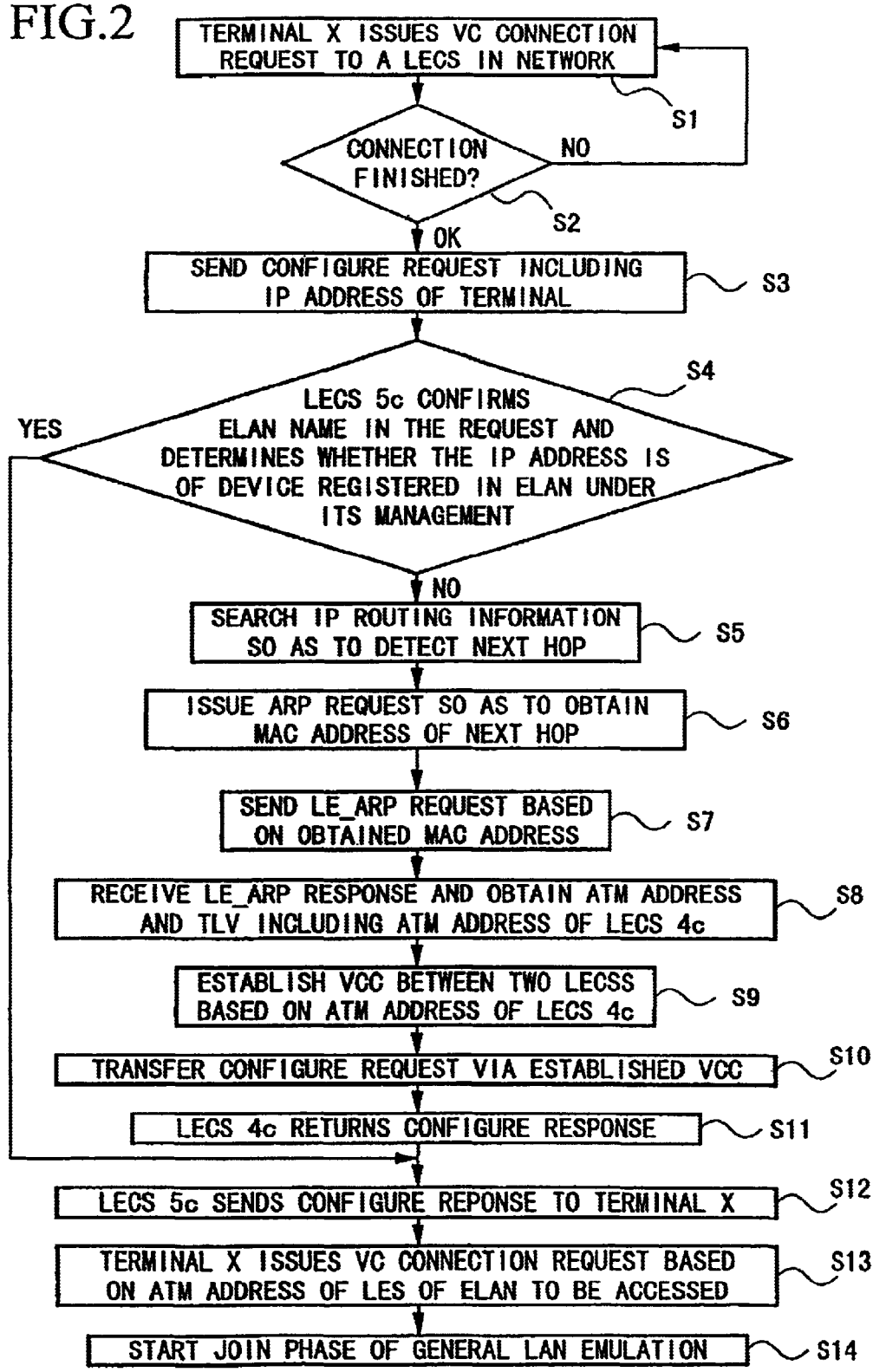

ATM LAN EMULATION NETWORK HAVING LECS FOR PROVIDING ATM ADDRESS OF LES OF TARGET ELAN

BACKGROUND OF THE INVENTION

1. Field of the Invention

The present invention relates to an ATM LAN emulation network employing the ATM (asynchronous transfer mode) as the communication method, in particular, to an automatic accessing technique.

This application is based on patent application Ser. No. Hei 10-344637 filed in Japan, the contents of which are incorporated herein by reference.

2. Description of the Related Art

As generally known, the ATM LAN emulation network is realized by interconnecting an existing LAN (local area network) and an ATM LAN which employs the ATM so as to execute an application (software) on the ATM LAN as well as on the existing LAN. In such an ATM LAN emulation network, a plurality of ELANs (i.e., emulated LANs) are connected to each other via routers.

In the above ATM LAN emulation network, if a terminal which was connected to an ELAN then accesses this ELAN via another ELAN so as to execute an operation, the terminal must designate (i) the ATM address of the LES (LAN emulation server) which manages the ELAN to be accessed and (ii) the name of the ELAN to be accessed.

As an existing LAN emulation function, the ELAN accessing method using a "Well-known" address is known. However, in this function, the terminal can only access an LECS (LAN emulation configuration server) designated by the Well-known address, and cannot access the target ELAN unless the ELAN name is designated.

As described above, in order that a terminal accesses a target ELAN (to which this terminal was previously connected) via another ELAN in the conventional ATM LAN emulation network, it is necessary to designate (i) the ATM address of the LES which manages the target ELAN and (ii) the ELAN name of the target ELAN. However, at the terminal side, the management of the ATM addresses are scarcely performed; thus, it is difficult for the terminal to designate the above ATM address of the LES. Therefore, the terminal has to execute a very complicated operation so as to access a target ELAN (physically separated from the terminal) other than the ELAN to 10 which the terminal is connected.

SUMMARY OF THE INVENTION

In consideration of the above circumstances, an objective of the present invention is to provide an ATM LAN emulation network in which a terminal can easily access a target ELAN (to which the terminal was previously connected) via another ELAN so as to execute an operation in the target ELAN.

Therefore, the present invention provides an ATM LAN emulation network comprising emulated LANs (ELANs) in which a plurality of terminals are connected to each other via ATM switches and communication between the terminals is managed by a LAN emulation server (LES) mounted at the ATM switch, where the ELANs are interconnected by interconnecting the ATM switches via LAN emulation clients (LECs) mounted at routers, the ATM LAN emulation network comprising:

a LAN emulation configuration server (LECS), mounted at each router, for managing communication with the LES, where the ATM address of the LECS is stored in advance in the LES of the ATM switch connected to the relevant router; and a broadcast unknown server (BUS) mounted at the ATM switch which is connected to the router, and wherein when a specified terminal accesses the first ELAN and communicates with the relevant LECS by using a Well-known address, and sends a request, including its own IP address, for obtaining the ATM address of the LES which manages the second ELAN to which the specified terminal was previously connected and thus the IP address is related, the LECS which receives the request then determines whether the specified terminal is registered in the first ELAN connected to the router at which this LECS is mounted, based on the IP address of the specified terminal and IP routing information of this router, if the specified terminal is not registered in the first ELAN, then the LECS obtains the MAC address of the LEC mounted at the router as the next hop indicated by the IP routing information, via the BUS mounted at the ATM switch of a candidate ELAN other than the first ELAN, and the LECS sends the candidate LES which manages the candidate ELAN a request for obtaining the ATM address of the LEC mounted at the next-hop router, based on the obtained MAC address, the candidate LES which receives the above request then sends its own ATM address together with the ATM address of the LECS of the next-hop router, which is stored in advance, the LECS communicating with the specified terminal receives the ATM address of the LECS of the next-hop router, and transfers the request received from the specified terminal to this LECS according to the obtained ATM address, if the candidate ELAN is the second ELAN, the LECS which receives the transferred request then returns the ATM address of the LES which manages the second ELAN, and the specified terminal X obtains this returned ATM address of the LES via the LECS communicating with the specified terminal, and accesses the second ELAN according to the obtained ATM address of the LES so as to operate on the second ELAN.

The present invention also provides an ATM LAN emulation network having similar ELANs, comprising:

a LAN emulation configuration server (LECS), mounted at each router, for managing communication with the LES, the LECS having a table storing the ATM addresses of the LECSs mounted at the other routers together with the corresponding IP addresses; and a broadcast unknown server (BUS) mounted at the ATM switch which is connected to the router, and wherein when a specified terminal accesses the first ELAN and communicates with the relevant LECS by using a Well-known address, and sends a request, including its own IP address, for obtaining the ATM address of the LES which manages the second ELAN to which the specified terminal was previously connected and thus the IP address is related, the LECS which receives the request then searches the table and detects the ATM address of the LECS of the second ELAN corresponding to the IP address of the specified terminal, and transfers the request to the LECS of the second ELAN, the LECS of the second ELAN, which receives the transferred request, then returns the ATM address of the LES which manages the second ELAN, and the specified terminal X obtains this returned ATM address of the LES via the LECS communicating with the specified terminal, and accesses the second ELAN according to the obtained ATM address of the LES so as to operate on the second ELAN.

According to the present invention, the specified terminal can automatically obtain the ATM address of the LES of the target ELAN to be accessed so as to access and operate on the target ELAN. Therefore, the specified ELAN can access the target ELAN via any ELAN (at any location) other than the target ELAN, thereby improving the convenience of the ATM LAN emulation network. For example, if the specified terminal which is a portable type and was previously operated on the second ELAN is moved and connected to the first ELAN in a distant area, no specific setting change is necessary for the specified terminal, and the specified terminal can easily access and operate on the second ELAN via the first ELAN.

BRIEF DESCRIPTION OF THE DRAWINGS

FIG. 1 is a diagram showing the system arrangement of an embodiment according to the present invention.

FIG. 2 is a flowchart showing the operation of the above system.

DESCRIPTION OF THE PREFERRED EMBODIMENTS

Hereinafter, an embodiment of the ATM LAN emulation network according to the present invention will be explained with reference to the drawings.

FIG. 1 shows the system arrangement of the present embodiment. In this figure, reference numerals 1*a* to 1*c*, 2*a*, 2*b*, 3*a*, 3*b*, and X indicate terminals (here, terminal X is a specified terminal explained later), reference numerals 1*e*, 1*f*, 2*c*, and 3*c* indicate ATM switches, and reference numerals 4 and 5 indicate routers.

Among these structural elements, terminals 1*a* to 1*c* and ATM switches 1*e* and 1*f* constitute ELAN1, terminals 2*a* and 2*b* and ATM switch 2*c* constitute ELAN2, and terminals 3*a* and 3*b* and ATM switch 3*c* constitute ELAN3.

In ELAN1, the ATM switches 1*e* and 1*f* are connected with each other via an ATM line, and ATM switch 1*e* is connected to terminal 1*a* while terminals 1*b* and 1*c* are connected to ATM switch 1*f*.

In ELAN2, both terminals 2*a* and 2*b* are connected to ATM switch 2*c*.

In ELAN3, both terminals 3*a* and 3*b* are connected to ATM switch 3*c*.

In addition, the ATM switch 1*e* of ELAN1 is interconnected with ATM switch 2*c* of ELAN2 via router 4, and the ATM switch 2*c* is interconnected with ATM switch 3*c* of ELAN3 via router 5.

LES (LAN emulation server) 1*g* and BUS (broadcast unknown server) 1*h* are mounted at ATM switch 1*e*. Similarly, LES 2*d* and BUS 2*e* are mounted at the ATM switch 2*c*, and LES 3*d* and BUS 3*e* are mounted at the ATM switch 3*c*. Here, LES 1*g* is a server for managing the communication inside ELAN1, LES 2*d* is a server for managing the communication inside ELAN2, while LES 3*d* is a server for managing the communication inside ELAN3.

The above terminals 1*a* to 1*c*, 2*a*, 2*b*, 3*a*, 3*b*, and X have an additional function (by using hardware coding), by which when each terminal is connected to an ATM switch, the terminal issues a VC (virtual channel) connection request to a (non-fixed) LECS (LAN emulation configuration server) included in the ATM LAN emulation network by using a Well-known address. Here, the Well-known address is a functional address used in the ATM network.

The LEC (LAN emulation client) 4*a* registered (as a subscriber) in ELAN1, LEC 4*b* registered in ELAN2, and LECS 4*c* are mounted at router 4; thus, the router 4 also has additional functions other than the original routing function. Similarly, the router 5 has additional factions by having LEC 5*a* registered in ELAN2, LEC 5*b* registered in ELAN3, and LECS 5*c*.

The routers 4 and 5 use novel TLVs (Type-length values). That is, when an ELAN (ELAN1, ELAN2, or ELAN3) is connected to the router 4 or 5, the router stores the ATM address of its own LECS (4*c* or 5*c*) in the LES (1*g*, 2*d*, or 3*d*) of the connected ATM switch (1*e*, 2*c*, or 3*c*).

For example, when the ATM switch 1*e* is connected to router 4, the LEC 4*a* mounted at the router 4 registers the ATM address of LECS 4*c* in LES 1*g* mounted at ATM switch 1*e*. Similarly, when the ATM switch 2*c* is connected to router 4, the LEC 4*b* registers the ATM address of LECS 4*c* in LES 2*d* mounted at ATM switch 2*c*.

On the other hand, when the ATM switch 2*c* is connected to router 5, the LEC 5*a* mounted at the router 5 registers the ATM address of LECS 5*c* in LES 2*d* mounted at ATM switch 2*c*. Similarly, when the ATM switch 3*c* is connected to router 5, the LEC 5*b* registers the ATM address of LECS 5*c* in LES 3*d* mounted at ATM switch 3*c*.

Below, with reference to the flowchart of FIG. 2, a specific example operation will be explained, in which the specified terminal X, which previously operated in ELAN 1 and thus having the relevant IP address, is going to access and operate in ELAN1 via ATM switch 3*c* of ELAN 3.

When the specified terminal X having the above-explained additional function (by hardware coding) is connected to the ATM switch 3*c*, the terminal X issues a VC (virtual channel) connection request using a Well-known address (see step S1). Here, the above VC connection request can be sent to a (not fixed) LECS included in the LAN emulation network, that is, to one of LECSs 4*c* and 5*c* mounted at routers 4 and 5.

If the above VC connection request is directed to LECS 5*c* mounted at the router 5, after the connection process is finished (see step S2), the specified terminal X then issues a "Configure" request to LECS 5*c*, where the request is sent for obtaining the ATM address of LES 1*g* which manages ELAN1 (see step S3). This Configure request includes the IP address (i.e., the Internet address) of the specified terminal X and the name of the target ELAN 1 (i.e., the ELAN name) to be accessed.

When LECS 5*c* receives the Configure request, the LECS 5*c* confirms the IP address of the specified terminal X and the ELAN name of ELAN1 which is the target for obtaining the ATM address, and determines whether the IP address of the specified terminal X agrees with any IP address of the devices registered in ELAN3 or ELAN2 which the LECS 5*c* manages, by searching IP routing information stored in router 5 at which the LECS 5*c* is provided (see step S4).

Here, the specified terminal X is not a subscriber for neither ELAN3 nor ELAN2; thus, the LECS 5*c* determines that the IP address included in the request does not agree with any IP address of the devices under its management. Therefore, the LECS 5*c* sends an ARP (address resolution protocol) request (for obtaining a MAC (media access control) address) to BUS 2e of ATM switch 2c, according to the next hop registered in the IP routing information of router 5 (see steps S5 and S6). Here, LECS 5c sends the ARP request via LEC 5a (registered in ELAN2) to BUS 2e.

When the BUS 2e receives the ARP request, the BUS 2e obtains the MAC address of LEC 4b which is mounted at router 4 (i.e., the next hop) (see step S6), and sends the MAC address to LEC 5a. When the LEC 5a receives this MAC address, the LEC 5a sends LES 2d an LE_ARP request for obtaining the ATM address of LEC 4b corresponding to the obtained MAC address (see step S7).

When the LES 2d receives the LE_ARP request, the LES 2d sends LEC 5a an LE_ARP response as the response to the LE_ARP request (see step S8). The LE_ARP response includes the ATM address of LEC 4b and the above-described novel TLV which includes the ATM address of LECS 4c mounted at router 4.

As explained above, the ATM address of LECS 4c was stored in advance in LES 2d by LECS 4c. That is, when the ATM switch 2c is connected to the outer 4, the ATM address of LECS 4c stored in LES 2d is sent to LEC 5a together with the ATM address of LEC 4b.

The ATM address of LECS 4c is obtained via LEC 5a by LECS 5c. The LECS 5c establishes the VC connection with the LECS 4c of router 4 based on the obtained ATM address of LECS 4c (see step S9), and transfers the above Configure request to LECS 4c by using the VC connection (see step S10).

When the LECS 4c receives the Configure request, the LECS 4c confirms the ELAN name included in the request. If the confirmed ELAN name corresponds to the ELAN connected to LECS 4c, that is, ELAN1, then the LECS 4c sends LECS 5c a Configure response including the ATM address of LES 1g which manages ELAN 1 (see step S11).

When the LECS 5c receives the Configure response, the LECS 5c directly transfers the Configure response to terminal X (see step S12). The terminal X receives the Configure response, and issues a VC connection request according to the ATM address of LES 1g included in the Configure response (see step S13). That is, the specified terminal X can automatically obtain the ATM address of LES 1g which manages ELAN1, the target ELAN to be accessed, via another ELAN 3. The following processes are performed according to the join phase of the general LAN emulation (see step S14).

According to the present embodiment, no change is necessary for the setting of the specified terminal X, and only by connecting the ATM switch 3c, the specified terminal X can automatically communicate with LES 1g which manages ELAN 1 and operate on ELAN1. That is, the specified terminal X previously operated on ELAN1; thus, its IP address and the ELAN name of ELAN 1 have already been specified. Accordingly, only by connecting to ATM switch 3c, the specified terminal X can automatically obtain the ATM address of LES 1g and directly communicate with LES 1g so as to operate on ELAN1.

Therefore, according to the present embodiment, no specific functional modification at the ELAN side (that is, of each terminal or the like) is necessary and only the programs stored and performed in the router and the ATM switch have small modifications so as to add some necessary steps. Therefore, the required cost is low and the present method can be easily introduced to existing networks. Here, the LECS is mounted at the router so that the LECS can easily obtain IP routing information stored in the router.

If the target ELAN1 to be accessed is connected with the ELAN3 via three or more routers, the specified terminal X can automatically access the ELAN1 by repeating a similar operation based on the IP routing information.

Also in the present embodiment, the ATM addresses of LECSs 4c and 5c mounted at routers 4 and 5 are stored in advance in ATM switches 1e, 2c, and 3c connected to routers 4 and 5; thus, the LECS s 4c and 5c can obtain or confirm the ATM address of the LECS as the next hop. The following method can also be possible for obtaining the ATM address of the next-hop LECS.

That is, a table is stored in each of routers 4 and 5, in which the ATM addresses of each next hop are registered together with the corresponding IP addresses. Here, in the table of router 4, the ATM address of LECS 5c is registered together with the corresponding IP address, while in the table of router 5, the ATM address of LECS 4c is registered together with the corresponding IP address.

For example, when the LECS 5c receives a Configure request from the specified terminal V, the LECS 5c searches the above table based on the IP address appended to the Configure request, and detects the ATM address of LECS 4c connected to ELAN1 corresponding to the relevant IP address. Accordingly, the LECS 5c can establish the VC connection with LECS 4c based on the detected ATM address, and transfer the Configure request (from terminal X) to LECS 4c.

In this method, the above tables must be updated every time a new ELAN is connected and added to the ATM LAN emulation network; however, the specified terminal can automatically access ELAN1.

What is claimed is:

1. An ATM LAN emulation network comprising emulated LANs (ELANs) in which a plurality of terminals are connected to each other via ATM switches and communication between the terminals is managed by a LAN emulation server (LES) mounted at least one ATM switch per ELAN, where the ELANs are interconnected by interconnecting the ATM switches via LAN emulation clients (LECs) mounted at routers, the ATM LAN emulation network comprising:

a LAN emulation configuration server (LECS), mounted at each router, for managing communication with the LES, where the ATM address of the LECS is stored in advance in the LES mounted in the ATM switch to which said each router is connected; and a broadcast unknown server (BUS) mounted at the ATM switch which is connected to said each router, and wherein when a specified terminal accesses a first ELAN from the ELANs and communicates with a first LECS mounted on a first router connected to the first ELAN by using a Well-known address, and sends a first request, including its own IP address, for obtaining the ATM address of a second LES which manages a second ELAN from the ELANs to which the specified terminal was previously connected, the first LECS which receives the request then determines whether the specified terminal is registered in the first ELAN, based on the IP address of the specified terminal and IP routing information of the first router, if the specified terminal is not registered in the first ELAN, the first LECS obtains the MAC address of an LEC mounted at a second router as the next hop indicated by the IP routing information, via a candidate BUS mounted at a candidate ATM switch of a candidate ELAN other than the first ELAN, and the first LECS sends a candidate LES which manages the candidate ELAN a second request for obtaining the ATM address of the LEC mounted at the second router, based on the obtained MAC address, the candidate LES which receives the second request then sends its own ATM address together with the ATM address of a second LECS of the second router, which is stored in advance, the first LECS communicating with the specified terminal receives the ATM address of the second LECS of the second router, and transfers the first request received from the specified terminal to the second LECS according to the obtained ATM address, if the second LECS is connected to the second ELAN, the second LECS which receives the transferred request then returns the ATM address of the second LES which manages the second ELAN, and the specified terminal obtains this returned ATM address of the second LES via the first LECS communicating with the specified terminal, and accesses the second ELAN according to the obtained ATM address of the second LES so as to operate on the second ELAN.

2. An ATM LAN emulation network comprising emulated LANs (ELANs) in which a plurality of terminals are connected to each other via ATM switches and communication between the terminals is managed by a LAN emulation server (LES) mounted at least one ATM switch per ELAN, where the ELANs are interconnected by interconnecting the ATM switches via LAN emulation clients (LECs) mounted at routers, the ATM LAN emulation network comprising:

a LAN emulation configuration server (LECS), mounted at each router, for managing communication with the LES, the LECS having a table storing the ATM addresses of the LECSs mounted at routers other than said each router together with the corresponding IP addresses; and a broadcast unknown server (BUS) mounted at the ATM switch which is connected to said each router, and wherein when a specified terminal accesses a first ELAN from the ELANs and communicates with a first LECS mounted on a first router connected to the first ELAN by using a Well-known address, and sends a request, including its own IP address, for obtaining the ATM address of a second LES which manages a second ELAN from the ELANs to which the specified terminal was previously connected, the first LECS which receives the request then searches the table and detects the ATM address of the second LECS of the second ELAN corresponding to the IP address of the specified terminal, and transfers the request to the second LECS of the second ELAN, the second LECS of the second ELAN, which receives the transferred request, then returns the ATM address of the second LES which manages the second ELAN, and the specified terminal obtains this returned ATM address of the second LES via the first LECS communicating with the specified terminal, and accesses the second ELAN according to the obtained ATM address of the second LES so as to operate on the second ELAN.

* * * * *